United States Patent
Wang (10) Patent No.: US 8,045,610 B2
(45) Date of Patent: Oct. 25, 2011

(54) MMSE-DFE EQUALIZATION WITH ANTENNA DIVERSITY FOR MOBILE DTV

(75) Inventor: Huahui Wang, Wheeling, IL (US)

(73) Assignee: Zenith Electronics LLC, Lincolnshire, IL (US)

( * ) Notice: Subject to any disclaimer, the term of this patent is extended or adjusted under 35 U.S.C. 154(b) by 829 days.

(21) Appl. No.: 11/962,433

(22) Filed: Dec. 21, 2007

(65) Prior Publication Data

US 2009/0161748 A1    Jun. 25, 2009

(51) Int. Cl.
*H03H 7/30* (2006.01)
(52) U.S. Cl. ........ 375/233; 327/154; 327/155; 343/751; 375/229
(58) Field of Classification Search ................. None
See application file for complete search history.

(56) References Cited

U.S. PATENT DOCUMENTS 4,602,863 A * 7/1986 Fritz et al. .................. 430/111.4
6,298,242 B1 * 10/2001 Schiff .......................... 455/522

OTHER PUBLICATIONS

C.A. Belfiore et al., "Decision Feedback Equalization", Proceedings of the IEEE, vol. 67, No. 8, Aug. 1979, pp. 1143-1156.
P. Balaban et al. Optimum Diversity Combining and Equalization in Digital Data Transmission with Applications to Cellular Mobile Radio—Part I: Theoretical Considerations, IEEE Transactions on Communications, vol. 40, No. 5, May 1992, pp. 885-894.
M.K. Simon et al., "Performance Analysis of Generalized Selection Combining With Threshold Test Per Branch (T-GSC)", IEEE Transactions on Vehicular Technology, vol. 51, No. 5, Sep. 2002, pp. 1018-1029.
B. Porat, "A Course in Digital Signal Processing", 13.2 Spectral Analysis by a Smoothed Periodogram, John Wiley & Sons, Inc., New York, 1997, pp. 519-521.

* cited by examiner

*Primary Examiner* — David C. Payne
*Assistant Examiner* — Adolf Dsouza

(57) ABSTRACT

A decision feedback equalizer has a feedback filter and K feed forward filter branches. Each of the K feed forward filter branches receives an input signal from a corresponding one of a plurality of channels associated with a corresponding one of a plurality of antennas, where K>1. Each of the K feed forward filter branches provides an output. An instantaneous SNR level $\gamma_k$ is determined for each of the K feed forward filter branches. The instantaneous SNR level $\gamma_k$ for each of the K feed forward filter branches is compared to an upper threshold $T_H$ and to a lower threshold $T_L$. The outputs from the K feed forward filter branches are selectively added dependent upon the comparing of the instantaneous SNR level $\gamma_k$ for each of the K feed forward filter branches to the upper threshold $T_H$ and to the lower threshold $T_L$.

20 Claims, 3 Drawing Sheets

MMSE-DFE EQUALIZATION WITH ANTENNA DIVERSITY FOR MOBILE DTV

TECHNICAL FIELD

The present application discloses an equalization technique, such as a minimum-mean square-error (MMSE) decision feedback equalization (DFE) technique, with receiver diversity to enhance reliable performance in fast fading channels for television systems, such as Advanced Television System Committee (ATSC) digital television (DTV) systems.

BACKGROUND

Severe frequency selective fading is one of the major sources of signal degradation in terrestrial digital television (DTV) broadcasting. A cause of this frequency selective fading is multipath where multiple copies of the transmitted signal travel to the receiver through different paths. Multipath results in intersymbol interference (ISI) at the receiver, which creates data errors if no effective equalization is performed.

Multipath is more severe for mobile DTV where the receiver is installed in a vehicle moving at a high rate of speed. In this case, the wireless channel varies and becomes uncorrelated over a short period of time. Deep fades occur more frequently in such dynamic conditions than in the static conditions, challenging the design of robust equalizers for such mobile applications.

Over the past years, linear equalization techniques based on the zero-forcing (ZF) constraint or the minimum mean squared error (MMSE) criterion have been under extensive investigation. These techniques have been widely documented in the wireless communication literature, owing to their mathematical tractability and desirable simplicity. The dominant solution used for terrestrial DTV receivers, however, is the nonlinear decision-feedback equalizer (DFE).

The decision-feedback equalizer has been shown to have significant performance advantages over linear equalizers, yet without the discouraging complexity of optimum nonlinear equalizers. For practical realization, some form of updating process, such as the least mean square (LMS) and the recursive least squares (RLS) algorithms, is used to update decision-feedback equalizers for changing channel conditions. However, when there is a precipitous fade, the tracking loops of decision-feedback equalizers may lose lock, resulting in a convergence problem. If so, errors will propagate throughout the data stream until the equalizer is reinitialized. The consequence of this error propagation is serious for decision-feedback equalizer receivers due to their inherent error propagation deficiencies.

A promising solution to such problems is to employ antenna diversity at the receiver. Theoretically, as long as two antennas are separated by more than half a wavelength, the channel characteristics of the two paths are independent. Hence, the probability of concurrent deep fades is small. When one channel fades, accurate symbol decisions can still be obtained from the other channel, so that the update process can continue without divergence. Thus, system performance is significantly improved with joint operation of the multiple antennas.

In Japan, DTV systems based on orthogonal frequency division multiplexing (OFDM) have been claimed to be able to achieve accurate mobile reception using multiple receive antennas.

Antenna diversity in an equalizer, such as an MMSE-DFE equalizer, is proposed herein and can be used effectively for the mobile reception of television such as ATSC DTV signals based on eight-level vestigial sideband (8-VSB) modulation. A "double-threshold" switching scheme is further proposed in combination with the multiple antenna branches. Thus, weak antenna branches can be excluded from equalization and can be included, in a timely manner, when the receiver moves out of the fade condition. As a further addition or alternative, a "soft" combination of the active branches further improves system performance.

BRIEF DESCRIPTION OF THE DRAWINGS

These and other features and advantages will become more apparent from a detailed consideration of the diverse antenna system when taken in conjunction with the drawings in which.

DETAILED DESCRIPTION

Figure 1:
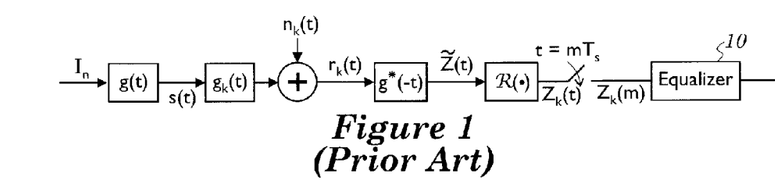
FIG. 1 illustrates a model of an ATSC DTV system over a certain channel.

FIG. 1 illustrates a model of an ATSC DTV system. The transmitted signal s(t) from the modulator of a transmitter can be written in accordance with the following equation:

$$s(t) = \sum_n I_n q(t - nT_s) \quad (1)$$

where $I_n$ is the nth transmitted symbol which takes on a value from the set $\{\pm 7, \pm 5, \pm 3, \pm 1\}$ with equal probability, $T_s$ is the symbol period, and q(t) is the complex root raised cosine pulse.

If it is assumed that a total of K receive antennas are deployed with adequate space to undergo independent channel fading, the signal $r_k(t)$ received at the $k^{th}$ antenna is given by the following equation:

$$r_k(t) = s(t) \star g_k(t) + n_k(t) \quad (2)$$

where $\star$ denotes convolution, $g_k(t)$ is the time-varying multipath channel at the kth antenna, and $n_k(t)$ is the complex additive noise at the kth antenna. Generally, the K noise sources, $n_k(t)$, are assumed to be independent complex white Gaussian processes with common double sided spectral densities $N_0$.

Figure 2:
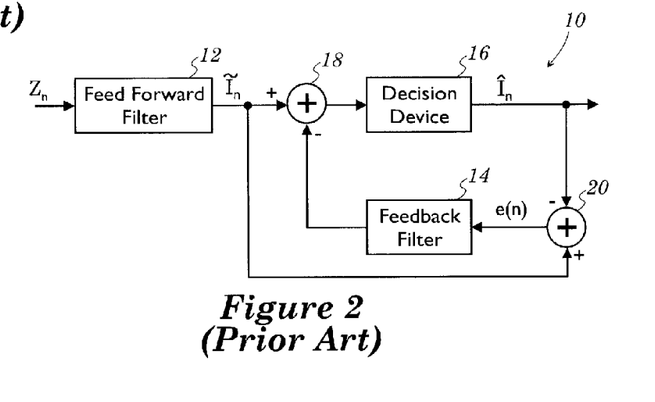
FIG. 2 illustrates the structure of a decision feedback equalizer.

As shown in FIG. 1, a root raised cosine matched filter $q^*(-t)$ is generally placed at the front end of the receiver, followed by an equalizer 10, which can be any form of equalizer such as the equalizer shown in FIG. 2. The output $\tilde{z}_k(t)$ of the root raised cosine matched filter $q^*(-t)$ at the kth antenna is given by the following equation:

$$z_k^\infty(t) = \sum_n I_n \tilde{h}_k(t - nT_s) + \tilde{\eta}_k(t) \quad (3)$$

where $\tilde{h}_k(t) = q(t) \star g_k(t) \star q^*(-t)$ is the composite channel and $\tilde{\eta}_k(t) = n_k(t) \star q^*(-t)$.

Since the 8-VSB constellation is real, only the real part of the input signal is processed by the equalizer 10 as indicated by the symbol $R(\bullet)$. The representation of the real part of the signal is given by the following equation:

$$z_k(t) = \sum_n I_n h_k(t - nT_s) + \eta_k(t) \quad (4)$$

where $z_k(t)$ represents the real part of $\tilde{z}_k(t)$, $h_k(t)$ represents the real part of $\tilde{h}_k(t)$, and $\eta_k(t)$ represents the real part of $\tilde{\eta}_k(t)$.

Sampling $z_k(t)$ at the symbol rate $t = mT_s$ is given by the following equation:

$$z_k[m] = \sum_n I_n h_k[m - n] + \eta_k[m] \quad (5)$$

The expectation value of the noise term $\eta_k[m]$ is given by the following equation:

$$E\{\eta_k[m]\eta_k[m-n]\} = N_0 \delta[n] \quad (6)$$

where $\delta[n]$ is the Kronecker delta.

For the case of a single antenna, a known MMSE-DFE equalizer 10 as shown in FIG. 2 has a feed forward filter (FFF) 12 and a feedback filter (FBF) 14, which are jointly designed to minimize the mean square error (MSE) at the input of a decision device 16 of the MMSE-DFE equalizer 10. The output of the feedback filter 14 is subtracted from the output $\tilde{I}_n$ of the feed forward filter 12 by a summer 18, and the output of the summer 18 is supplied to the decision device 16 which, for example, might be a slicer. The output $\hat{I}_n$ of the decision device 16 is subtracted from the output $\tilde{I}_n$ of the feed forward filter 12 by a summer 20 to form an error $e(n)$ that is input to the feedback filter 14.

If the composite channel is $h(t)$ and its frequency response is denoted as $H(f)$, the optimum form of the feed forward filter 12 has a frequency response given by the following equation:

$$U(f) = \frac{H^*(f)}{|H(f)|^2 + N_0/E_s} \quad (7)$$

where the superscript * denotes the complex conjugate, and $E_s$ is the average energy of the transmitted symbol.

The feedback filter 14 is a linear predictor which takes as its input $e(n)$ the difference between the output $\tilde{I}_n$ of the feed forward filter 12 and the output $\hat{I}_n$ of the decision device 16. The feedback filter 14 has an optimum frequency response given by the following equation:

$$B(f) = 1 - \frac{P(f)}{p_0} \quad (8)$$

where $p_0$ is the first coefficient of the expansion given by the following equation:

$$P(f) = \sum_{n=0}^{\infty} p_n \exp(-j2\pi f n T_s) \quad (9)$$

and $P(f)$ is the solution to the spectral factorization given by the following equation:

$$P(f)P^*(-f) = \frac{1}{|E(f)|^2} \quad (10)$$

where $|E(f)|^2$ is the power spectral density of the total noise and ISI at the output of the feed forward filter 12, which can be obtained in theory according to the following equation:

$$|E(f)|^2 = \frac{N_0/E_s}{|H(f)|^2 + N_0/E_s} \quad (11)$$

For the case of multiple antennas such as K antennas, by assuming ideal postcursor cancellation, i.e., the intersymbol interference (ISI) from previous symbols has been completely removed, an optimum combining scheme may be derived where the combiner is composed of a set of K matched filters whose outputs are summed and the summation is passed to a purely anticausal tapped delay line. Although such a structure produces the best MSE, its implementation in the frequency domain could be difficult, since the pure anticausality of the tapped delay line makes it hard to use the Fast Fourier Transform (FFT).

Figure 3:
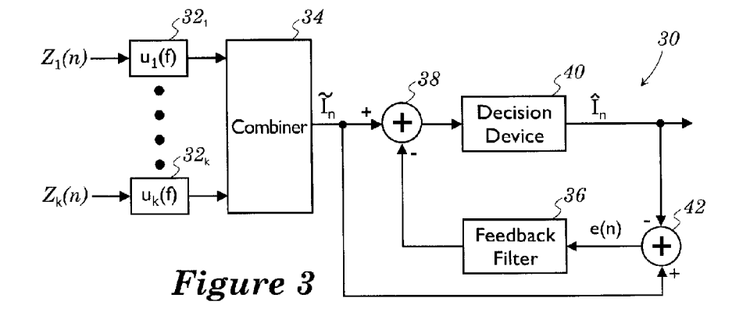
FIG. 3 illustrates the structure of a decision feedback equalizer adapted with antenna diversity.

To efficiently implement equalization in the frequency domain, a combiner for a known minimum mean squared error (MMSE) decision feedback equalizer (DFE) 30 can be adopted as illustrated in FIG. 3. The decision feedback equalizer 30 has a first feed forward filter (FFF) branch $32_1, \ldots,$ and a $K^{th}$ feed forward filter (FFF) branch $32_K$, whose outputs are combined by a combiner 34 in the manner discussed below. The decision feedback equalizer 30 also has a feedback filter (FBF) 36 and a summer 38 which sums the outputs from the combiner 34 and the feedback filter 36. The output $\tilde{I}_n$ of the feedback filter 36 is subtracted from the output of the combiner 34 by the summer 38, and the output of the summer 38 is supplied to a decision device 40 which, for example, might be a slicer. The output $\hat{I}_n$ of the decision device 40 is subtracted from the output $\tilde{I}_n$ of the combiner 34 by a summer 42 to form an error $e(n)$ that is input to the feedback filter 36.

By assuming perfect knowledge of channel characteristics and noise spectral density, the frequency response of the $k^{th}$ branch of the feed forward filter branches $32_1$ through $32_K$ is given by the following equation:

$$U_k(f) = \frac{H_k^*(f)}{\sum_{i=1}^{K} |H_i(f)|^2 + N_0/E_s} \quad (12)$$

Equation (12) can be used in the design of the feedback filter 36 by deriving the expression of $|E(f)|^2$ as given by the following equation:

$$|E(f)|^2 = \frac{N_0/E_s}{\sum_{i=1}^{K} |H_i(f)|^2 + N_0/E_s} \quad (13)$$

While equations (12) and (13) assume perfect knowledge of channel characteristics and noise spectral density, the quantities of $H_k(f)$ and $N_0$ in practice must be estimated at the receiver. These estimates may be denoted as $\hat{H}_k(f)$ and $\hat{N}_0$, respectively. For each ATSC digital television (DTV) data field, the first data segment is the field sync segment consisting of predetermined symbols that may be used as training symbols. These symbols, because they are predetermined, are known at the receiver. Thus, various algorithms may be used at the $k^{th}$ antenna branch for the initial channel estimation $\hat{H}_k(f)$. The estimate of $N_0$ at the $k^{th}$ branch, $\hat{N}_k$, can be measured from the corresponding received signal by aid of the estimated channel $\hat{H}_k(f)$ and the training symbols. The noise term $\hat{N}_0$ can be obtained by averaging $\hat{N}_k$, k=1, ..., K.

The received data is usually segmented into small blocks for processing. The choice of the block length depends both on hardware complexity and on the fading rate of the channel. Approximations can be made that the channel remains constant within each block, and that the channels in two consecutive blocks are highly correlated. Therefore, given these approximations, the channel estimate $\hat{H}_k(f)$ from the previous block can be used in the current block to perform equalization.

Based on the estimations $\hat{H}_k(f)$ and $\hat{N}_0$, the frequency response of the $k^{th}$ feed forward filter branch is given by the following equation:

$$\hat{U}_k(f) = \frac{\hat{H}_k^*(f)}{\sum_{i=1}^{K} |\hat{H}_i(f)|^2 + \hat{N}_0/E_s} \quad (14)$$

On the other hand, the feedback filter 36 of the decision feedback equalizer 30 can be calculated according to the following equation:

$$|\hat{E}(f)|^2 = \frac{\hat{N}_0/E_s}{\sum_{i=1}^{K} |\hat{H}_i(f)|^2 + \hat{N}_0/E_s} \quad (15)$$

$|E(f)|^2$ in equation (15) is the power spectral density of the total noise and ISI at the output of the feed forward filter 12. Equation (15) is used to determine the term $B(f)$ in equation (8). Then both equations (8) and (14) are sampled in the frequency domain to obtain the taps of the feed forward filter branches $32_1, \ldots, 32_k$ and of the feedback filter 36.

Figure 6:
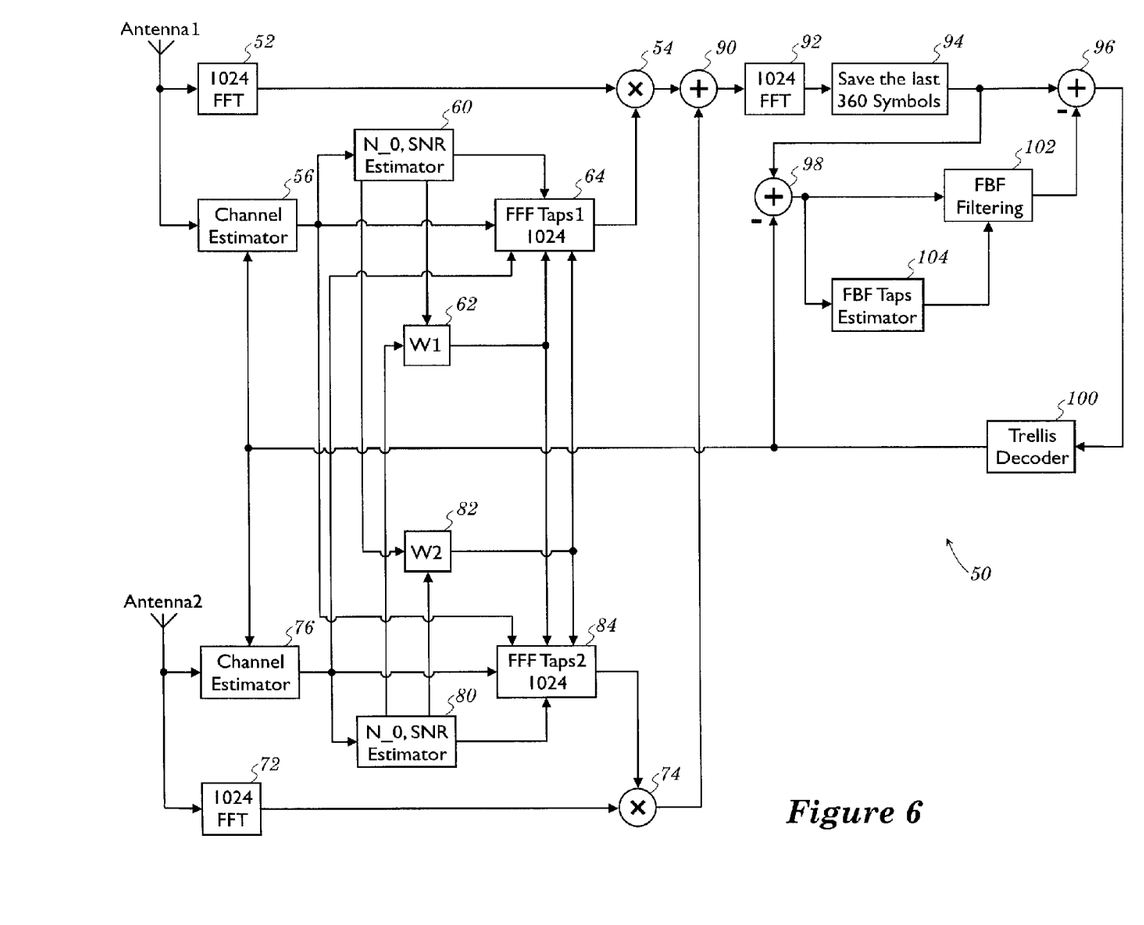

The taps of the feed forward filter branches $32_1, \ldots, 32_k$ can be obtained using FFT blocks as shown in FIG. 6 discussed below. The taps of the feedback filter 36 can be obtained in a similar manner.

As long as the estimate $\hat{H}_k(f)$ for the $k^{th}$ channel does not deviate significantly from the perfectly determined channel $H_k(f)$, reliable symbol estimates are available after these processes. With these symbol estimates, the channel in the current block can be recursively updated using, for example, a conjugate gradient algorithm based on the least squares criterion.

Since the channel is dynamically changing, the channel will undergo deep fades from time to time. Thus the signal to noise ratio (SNR) level at each antenna varies as time elapses. When the SNR of an antenna branch is below a certain threshold, the output of that branch behaves as an interferer instead of a contributor. Consequently, both $\hat{H}_k(f)$ and $\hat{N}_k$ for such a branch will deviate significantly from their corresponding true values, making equations (14) and (15) produce false results. Involving such a branch in equalization could degrade the accuracy of the symbol estimates, which, in turn, degrades the accuracy of the channel update. Errors may propagate through the equalizer if the channel strength at that antenna does not soon improve, and the system will not be reliable until the next sync segment is received. Such a problem becomes serious when the channels vary quickly yet the number of antennas is limited.

To overcome this problem, a flag $f_k$ can be placed at each branch whereby the flag $f_k$ indicates whether the signal from that branch should be involved in equalization. During each block, since $\hat{H}_k(f)$ and $\hat{N}_0$ are estimated, the instantaneous SNR level $\gamma_k$ can then be easily estimated by the combiner 34 in accordance with the following equation:

$$\gamma_k = \frac{\|\hat{H}_k(f)\|^2 E_s}{\hat{N}_0} \quad (16)$$

The operator $\|\cdot\|$ represents the norm of •. The flag $f_k$ can be determined by comparing the SNR level $\gamma_k$ to a preset threshold T as given by the following equation:

$$f_k = \begin{cases} 1, & \gamma_k \geq T \\ 0, & \gamma_k < T \end{cases} \quad (17)$$

In the case of digital television broadcasting, the value of T is related to the threshold of visibility (TOV), i.e., the minimum required SNR for the proper reception of the digital television broadcasting, such that T can be empirically determined.

The general idea of switching a branch based on a threshold is known. In fast fading cases, however, improvement is necessitated for several reasons. Taking a two antenna receiver as an example, one of the branches may suffer a precipitous channel fade and quickly become an interferer. When the threshold T is too small, a burst of errors would occur and deteriorate the overall equalization process. In such a case, it is desirable to prevent the degradation as early as possible so that a larger threshold is preferred.

On the other hand, when the strength of the "off" branch starts to improve, it is desirable to involve that branch in the equalization process as quickly as possible, because the equalizer will produce much better performance than in the case of a single branch equalizer. Particularly, if the channel condition for the "on" branch also becomes critical, errors may have started propagating before the "off" branch is turned on. Thus, in this case, a small threshold is desired such that the improving branch can be involved in the equalization process as soon as possible.

Therefore, a double threshold arrangement, an upper threshold $T_H$ and a lower threshold $T_L$, should be used by the combiner 34 for the switching of the antenna branches. For example, the upper threshold $T_H$ can be set a higher than the threshold of visibility (TOV), and the lower threshold $T_L$ can be set lower than the threshold of visibility (TOV).

The "on-off" branch transition states can be determined by two factors. One factor is the channel's instantaneous SNR $\gamma_k$, and the other factor is a newly defined binary indicator $\rho_k$, which indicates whether the branch is in a "normal" state ($\rho_k=0$) or in a "recovery" state ($\rho_k=1$).

Figure 4:
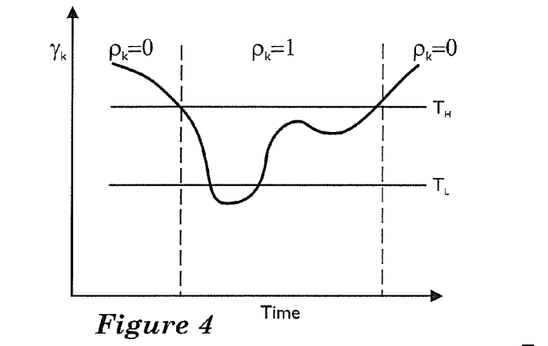
FIG. 4 is useful in explaining the use of double thresholds in selecting between antenna outputs.

Specifically, a branch is normally "on" until it is subject to a deep fade and then goes "off". The branch is thus in a "recovery" state trying to be "on" again as it moves out of the fade. (This operation is possible as long as other branches are in sufficiently good condition as to produce reliable symbol estimates.) When the state of the branch is back to "on" and the signal becomes strong enough, e.g., $\gamma_k>T_H$, the branch is defined to be "normal" again. The alteration of the binary indicator $\rho_k$ is illustrated in FIG. 4.

Figure 5:
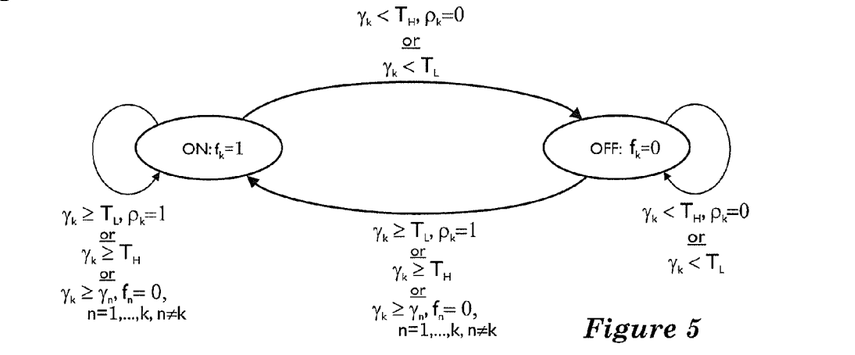
FIG. 5 is a state transition diagram useful in explaining the use of double thresholds in selecting between antenna outputs; and, FIG. 6 shows by way of example only an FFT implementation of the equalizer shown in FIG. 3.

The transition between the "on" and "off" states is jointly determined by $\gamma_k$ and $\rho_k$. FIG. 5 shows the diagram of the state transitions, where the conditions for each transition are annotated. The condition $\gamma_k \geq \gamma_n$, $f_n=0$, $n=1,\ldots,K$, $n \neq k$ means that, when all other branches are "off," the current branch is set to be "on" if it has the maximum SNR.

The flag $f_k$ is then determined by the combiner 34 as given in the following equation:

$$f_k = \begin{cases} 1, & \text{state "on"} \\ 0, & \text{state "off"} \end{cases} \quad (18)$$

Thus, when a branch becomes unreliable, the combiner 34 excludes it from equalization as soon as possible; as its condition improves, nevertheless, the combiner 34 quickly retrieves the branch. In other words, the combiner 34 does not include in the sum of the outputs of the feed forward filter branches 32$_1$ through 32$_K$ the output of any filter branch whose binary flag $f_k$ is 0, i.e., in the off state.

By using the binary flag $f_k$, a "hard" combination can be realized. However, various "reliable" channels are not distinguished. Further improvement can be made by performing a "soft" combination based on how reliable a "reliable" channel is. The contributions of two "reliable" channels could be enormously different, depending on how close they are to the threshold. A channel close to the threshold may be switched off during the next block, and naturally it should be counted on less. The idea illumines another line of thinking: For those channels being involved in equalization, a "soft" combination dependent on their estimated SNR $\hat{\gamma}_k$ can result in decent performance improvement.

The binary flag $f_k$ is then replaced by a "soft" weight, $w_k$, which is normalized and given by the following equation:

$$w_k = \frac{\hat{\gamma}_k f_k}{\sum_{i=1}^{K} \hat{\gamma}_i f_i} \quad (19)$$

The $k^{th}$ feed forward filter branch 32$_k$ is determined by the following equation:

$$\hat{U}_k(f) = \frac{w_k \hat{H}_k^*(f)}{\sum_{i=1}^{K} w_i |\hat{H}_i(f)|^2 + \hat{N}_0/E_s} \quad (20)$$

and the feedback filter 36 is obtained according to the following equation:

$$|\hat{E}(f)|^2 = \frac{\sum_{k=1}^{K} \frac{w_k \hat{N}_k}{E_s}\left[\frac{w_k \hat{N}_k}{E_s} + w_k |\hat{H}_k(f)|^2\right]}{\sum_{k=1}^{K} w_k |\hat{H}_k(f)|^2 + \frac{\hat{N}_0}{E_s}} \quad (21)$$

where $$\hat{N}_0 = \sum_{k=1}^{K} w_k \hat{N}_k \quad (22)$$

$|E(f)|^2$ of equation (21) is the power spectral density of the total noise and ISI at the output of the feed forward filter 12.

Since $w_k$ is dependent on $f_k$ and since $f_k$ has a value of either 1 or 0, the use of $w_k$ means that the branches whose $f_k$ are 0 are off and the branches whose $f_k$ are 1 are on but are weighted by $w_k$ such that an on branch having a small $w_k$ contributes less than an on branch having a large $w_k$.

As should be evident from the above description, the feed forward filter branches 32$_1$ through 32$_K$ and the feedback filter 36 can be implemented using estimated quantities $\hat{H}_k(f)$ and $\hat{N}_k$ according to equations (21) and (22). The advantage of such an implementation lies in its low computational complexity, especially when $\hat{H}_k(f)$ and $\hat{N}_k$ are readily at hand after the process of estimating the channel and the SNR.

Alternatively, if better error rate performance is desired, an implementation based on spectrum estimation can be exploited. Considering the dynamics of the situation, a smoothed periodogram method presented by B. Porat in *A course in digital signal processing*, Wiley, New York, N.Y., 1997 can be employed. This smoothed periodogram method is exclusively useful in cases where the data sequence is short.

The idea behind the smoothed periodogram method is to directly estimate $|E(f)|^2$ from the difference between the output $\tilde{I}_n$ of the combiner 34 and the estimated symbol at the output $\hat{I}_n$ of the decision device 40. In investigating a sequence of N symbols, the error e(n) between the output $\tilde{I}_n$ of the combiner 34 and the estimated symbol at the output $\hat{I}_n$ of the decision device 40 is given by the following equation:

$$e(n)=\tilde{I}_n-\hat{I}_n, 0 \leq n \leq N-1 \quad (23)$$

The autocorrelation of e(n) is estimated accordingly to the following equation:

$$\hat{\kappa}_e(m) = N^{-1} \sum_{i=0}^{N-1-|m|} [e(i)-\hat{\mu}_e][e(i+|m|)-\hat{\mu}_e] \text{ for } -(N-1) \leq m \leq (N-1) \quad (24)$$

where $$\hat{\mu}_e = N^{-1} \sum_{n=0}^{N-1} e(n) \quad (25)$$

is the estimated mean of e(n).

The autocorrelation $\hat{\kappa}_e(m)$ is weighted by a windowing sequence $\bar{\omega}(m)$, $-M \leq m \leq M$, $M \leq N-1$, and the estimate of $|E(f)|^2$ is then obtained from the Fourier transform of the following weighted sequence:

$$|\hat{E}(f)|^2 = \sum_{m=-M}^{M} \hat{\kappa}_e(m)\varpi(m)e^{-j2\pi fm} \quad (26)$$

Thus, the feedback filter 36 can be implemented in accordance with equation (26).

The computational burden of such an implementation lies in the estimation of the autocorrelation $\hat{\kappa}_e(m)$ in equation (24). However, the complexity can be reduced in practice by noting that the autocorrelation of a sequence can be regarded as the convolution of a sequence with the time reversal of itself. Therefore, $\hat{\kappa}_e(m)$ can be efficiently estimated using the FFT blocks as indicated by the following equation:

$$\hat{\kappa}_e = |\text{IFFT}\{\text{FFT}[\bar{e}] \otimes \text{FFT}[\bar{e}^\dagger]\} \quad (27)$$

where $\bar{e}^\dagger$ is the time reversal of the vector $\bar{e}$, $\otimes$ means element-wise multiplication, and $\bar{e} = [e(-N), \ldots e(0), e(1), \ldots, e(N-1)]$.

FIG. 6 shows by way of example only an FFT implementation 50 of the decision feedback equalizer 30 of FIG. 3. The FFT implementation 50 is shown as a two antenna implementation, although any number of input antennas can be used as desired.

A first FFT 52 is performed on the output of the first antenna and this FFT is applied to a first multiplier 54. The output of the first antenna is also applied to a first channel estimator 56 that estimates the channel associated with the first antenna in any suitable manner. The first channel estimator 56 relies on the output of the first antenna and also on a decoded equalizer output 58, as is typical of a decision feedback equalizer.

A first noise estimator 60 estimates values for $\hat{N}_0$ and SNR $\gamma_k$ as described above, and a first weight determiner 62 determines the "soft" weight $w_1$ in accordance with equation (19) as disclosed above. A first tap determiner 64 determines taps for the first branch of the FFT implementation 50 in accordance with equation (20) based on the channel estimate $\hat{H}_1(f)$ provided by first channel estimator 56, on $\hat{N}_0$ and SNR $\gamma_k$ provided by the first noise estimator 60, and on the "soft" weight $w_1$ determined by the first weight determiner 62. The first multiplier 54 then multiplies the taps provided by the first tap determiner 64 to the output of the first FFT 52. Thus, elements 52, 54, 56, 60, 62, and 64 form the first feed forward filter branch $32_1$ of the decision feedback equalizer 30.

A second FFT 72 is performed on the output of the second antenna and this FFT is applied to a second multiplier 74. The output of the second antenna is also applied to a second channel estimator 76 that estimates the channel associated with the second antenna in any suitable manner. The second channel estimator 76 relies on the output of the second antenna and also on the decoded equalizer output 58.

A second noise estimator 80 estimates values for $\hat{N}_0$ and SNR $\hat{\gamma}_k$ as described above, and a second weight determiner 82 determines the "soft" weight $w_2$ in accordance with equation (19) as disclosed above. A second tap determiner 84 determines taps for the second branch of the FFT implementation 50 in accordance with equation (20) based on the channel estimate $\hat{H}_1(f)$ provided by second channel estimator 76, on $\hat{N}_0$, and SNR $\gamma_k$ provided by the second noise estimator 80, and on the "soft" weight $w_2$ determined by the second weight determiner 82. The second multiplier 74 then multiplies the taps provided by the second tap determiner 84 to the output of the second FFT 72. Thus, elements 72, 74, 76, 80, 82, and 84 form the second feed forward filter branch $32_2$ of the decision feedback equalizer 30.

A summer 90 adds the outputs from the first and second multipliers 54 and 74. Thus, the adder forms the combiner 34 of the decision feedback equalizer 30.

The output of the summer 90 is inverse Fast Fourier Transformed by an IFFT 92, and a memory 94 saves the last 360 symbols provided by the IFFT 92. These symbols are provided to summers 96 and 98. The symbols stored in the memory 94 are decoded by a decoder 100. If the FFT implementation 50 of the decision feedback equalizer 30 is used in connection with a digital television receiver, then the decoder 100 may be a trellis decoder as shown in FIG. 6.

The summer 98 subtracts the output of the decoder 100 from the symbols stored in the memory 94 to provide an error. This error is applied to both a feedback filter 102 and to a feedback filter tap estimator 104. The feedback filter tap estimator 104 estimates taps for the feedback filter 102 in accordance with equation (21) and applies these taps to the feedback filter 102. The summer 96 subtracts the output of the feedback filter 102 from the symbols stored in the memory 94.

The summer 96 corresponds to the summer 38 of FIG. 3, the summer 98 corresponds to the summer 42 of FIG. 3, the feedback filter 102 and the feedback filter tap estimator 104 correspond to the feedback filter 36 of FIG. 3, and the decoder 100 corresponds to the decision device 40 of FIG. 3.

Modifications of the present invention will occur to those practicing in the art of the present invention. For example, the combiner 34 can be implemented as a computer or a dedicated processor that switches the feed forward filter branches $32_1$ through $32_K$ on and off without weighting of the branches, or that switches the feed forward filter branches $32_1$ through $32_K$ on and off with weighting of the branches.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

I claim:

1. A method of controlling a decision feedback equalizer having a feedback filter and K feed forward filter branches, wherein each of the K feed forward filter branches receives an input signal from a corresponding one of a plurality of channels associated with a corresponding one of a plurality of antennas, wherein K>1, wherein each of the K feed forward filter branches provides an output, the method comprising:

determining an instantaneous SNR level $\gamma_k$ for each of the K feed forward filter branches;

comparing the instantaneous SNR level $\gamma_k$ for each of the K feed forward filter branches to a double threshold, said double threshold including an upper threshold $T_H$ and a lower threshold $T_L$; and, selectively adding the outputs from the K feed forward filter branches dependent upon the comparing of the instantaneous SNR level $\gamma_k$ for each of the K feed forward filter branches to the upper threshold $T_H$ and to the lower threshold $T_L$.

2. The method of claim 1 wherein the selectively adding of the outputs from the K feed forward filter branches comprises determining whether each of the K feed forward filter branches is in a normal state or in a recovery state, wherein each of the K feed forward filter branches is in the recovery state when the instantaneous SNR level $\gamma_k$ for that feed forward filter branch is below the upper threshold $T_H$, and wherein each of the K feed forward filter branches is in the normal state when the instantaneous SNR level $\gamma_k$ for that feed forward filter branch is above the upper threshold $T_H$.

3. The method of claim 2 wherein the selectively adding of the outputs from the K feed forward filter branches further comprises transitioning at least one of the K feed forward filter branches from being selectively added to not being selectively added when either (i) the instantaneous SNR level $\gamma_k$ for the one feed forward filter branch is below the upper threshold $T_H$ and the one feed forward filter branch is in the normal state or (ii) the instantaneous SNR level $\gamma_k$ for the one feed forward filter branch is below the lower threshold $T_L$.

4. The method of claim 2 wherein the selectively adding of the outputs from the K feed forward filter branches further comprises transitioning at least one of the K feed forward filter branches from not being selectively added to being selectively added when either (i) the instantaneous SNR level $\gamma_k$ for the one feed forward filter branch is above the lower threshold $T_L$ and the one feed forward filter branch is in the recovery state or (ii) the instantaneous SNR level $\gamma_k$ for the one feed forward filter branch is greater than the upper threshold $T_H$.

5. The method of claim 1 wherein the selectively adding of the outputs from the K feed forward filter branches further comprises transitioning at least one of the K feed forward filter branches from being selectively added to not being selectively added when the instantaneous SNR level $\gamma_k$ for the one feed forward filter branch is below the lower threshold $T_L$.

6. The method of claim 1 wherein the selectively adding of the outputs from the K feed forward filter branches further comprises transitioning at least one of the K feed forward filter branches from not being selectively added to being selectively added when the instantaneous SNR level $\gamma_k$ for the one feed forward filter branch is greater than the upper threshold $T_H$.

7. The method of claim 6 wherein the selectively adding of the outputs from the K feed forward filter branches further comprises transitioning at least one of the K feed forward filter branches from not being selectively added to being selectively added when all others of the K feed forward filter branches are not being selectively summed and the instantaneous SNR level $\gamma_k$ for the one feed forward filter branch is above the instantaneous SNR levels $\gamma_k$ for all of the other feed forward filter branches.

8. The method of claim 1 wherein the selectively adding of the outputs from the K feed forward filter branches comprises adding the output of one of the K feed forward filter branches if the instantaneous SNR level $\gamma_k$ associated with the one of the K feed forward filter branches is greater than the lower threshold $T_L$, wherein the adding of the output of the one of the K feed forward filter branches includes applying a weight $w_k$ to the output of the one of the K feed forward filter branches, and wherein the weight $w_k$ is determined in accordance with the instantaneous SNR level $\gamma_k$ associated with the one of the K feed forward filter branches.

9. The method of claim 8 wherein each of the K feed forward filter branches comprises taps have tap weights, and wherein the method further comprises determining the tap weights for the taps of the K feed forward filter branches in accordance with the weight $w_k$, $H_k(f)$, and $N_0$, wherein $H_k(f)$ is a frequency response characterizing a channel over which the $k^{th}$ feed forward filter branch receives a signal, and wherein $N_0$ is noise characterizing the channels.

10. The method of claim 8 wherein the feedback filter comprises taps have tap weights, and wherein the method further comprises determining the tap weights for the taps of the feedback filter in accordance with the weight $w_k$, $H_k(f)$, and $N_0$, wherein $H_k(f)$ is a frequency response characterizing a channel over which the $k^{th}$ feed forward filter branch receives a signal, and wherein $N_0$ is noise characterizing the channels.

11. The method of claim 1 wherein the feedback filter comprises taps have tap weights, and wherein the method further comprises:
 determining an error based on the outputs of the K feed forward filter branches and of an output the decision feedback equalizer;
 autocorrelating the error; and
 determining the tap weights for the taps of the feedback filter in accordance with the autocorrelation of the error.

12. The method of claim 11 wherein the autocorrelating of the error comprises convolving the error with a time reversal of the error.

13. The method of claim 11 wherein the autocorrelating of the error comprises multiplying a Fast Fourier Transform of the error and a Fast Fourier Transform of a time reversal of the error.

14. The method of claim 1 wherein each of the K feed forward filter branches comprises taps have tap weights, and wherein the method further comprises determining the tap weights for the taps of the K feed forward filter branches in accordance with $H_k(f)$ and $N_0$, wherein $H_k(f)$ is a frequency response characterizing a channel over which the $k^{th}$ feed forward filter branch receives a signal, and wherein $N_0$ is noise characterizing the channels.

15. The method of claim 1 wherein the feedback filter comprises taps have tap weights, and wherein the method further comprises determining the tap weights for the taps of the feedback filter in accordance with $H_k(f)$ and $N_0$, wherein $H_k(f)$ is a frequency response characterizing a channel over which the $k^{th}$ feed forward filter branch receives a signal, and wherein $N_0$ is noise characterizing the channels.

16. The method of claim 1 wherein the selectively adding of the outputs from the K feed forward filter branches comprises not adding the output of one of the K feed forward filter branches if the instantaneous SNR level $\gamma_k$ associated with the one of the K feed forward filter branches is less than the lower threshold $T_L$.

17. A method of controlling a decision feedback equalizer having a feedback filter and K feed forward filter branches, wherein each of the K feed forward filter branches receives an input signal from a corresponding one of a plurality of channels associated with a corresponding one of a plurality of antennas, wherein K>1, wherein each of the K feed forward filter branches provides an output, the method comprising:
 determining an instantaneous SNR level $\gamma_k$ for each of the K feed forward filter branches;
 comparing the instantaneous SNR level $\gamma_k$ for each of the K feed forward filter branches to an upper threshold $T_H$ and to a lower threshold $T_L$;
 selectively adding the outputs from the K feed forward filter branches dependent upon the comparing of the instantaneous SNR level $\gamma_k$ for each of the K feed forward filter branches to the upper threshold $T_H$ and to the lower threshold $T_L$;
 wherein the selectively adding of the outputs from the K feed forward filter branches comprises determining whether each of the K feed forward filter branches is in a normal state or in a recovery state, wherein each of the K feed forward filter branches is in the recovery state when the instantaneous SNR level $\gamma_k$ for that feed forward filter branch is below the upper threshold $T_H$, and wherein each of the K feed forward filter branches is in the normal state when the instantaneous SNR level $\gamma_k$ for that feed forward filter branch is above the upper threshold $T_H$, wherein the selectively adding of the outputs from the K feed forward filter branches further comprises transitioning at least one of the K feed forward filter branches from not being selectively added to being selectively added when either (i) the instantaneous SNR level $\gamma_k$ for the one feed forward filter branch is above the lower threshold $T_L$ and the one feed forward filter branch is in the recovery state or (ii) the instantaneous SNR level $\gamma_k$ for the one feed forward filter branch is greater than the upper threshold $T_H$, and wherein the selectively adding of the outputs from the K feed forward filter branches further comprises transitioning at least one of the K feed forward filter branches from not being selectively added to being selectively added when all others of the K feed forward filter branches are not being selectively summed and the instantaneous SNR level $\gamma_k$ for the one feed forward filter branch is above the instantaneous SNR levels $\gamma_k$ for all of the other feed forward filter branches.

18. A method of controlling a decision feedback equalizer having a feedback filter and K feed forward filter branches, wherein each of the K feed forward filter branches receives an input signal from a corresponding one of a plurality of channels associated with a corresponding one of a plurality of antennas, wherein K>1, wherein each of the K feed forward filter branches provides an output, the method comprising:

determining an instantaneous SNR level $\gamma_k$ for each of the K feed forward filter branches;

comparing the instantaneous SNR level $\gamma_k$ for each of the K feed forward filter branches to an upper threshold $T_H$ and to a lower threshold $T_L$; and, selectively adding the outputs from the K feed forward filter branches dependent upon the comparing of the instantaneous SNR level $\gamma_k$ for each of the K feed forward filter branches to the upper threshold $T_H$ and to the lower threshold $T_L$; wherein the selectively adding of the outputs from the K feed forward filter branches comprises:

not adding the output of a first of the K feed forward filter branches if the instantaneous SNR level $\gamma_k$ associated with the first of the K feed forward filter branches is less than the lower threshold $T_L$; and, adding the output of a second of the K feed forward filter branches if the instantaneous SNR level $\gamma_k$ associated with the second of the K feed forward filter branches is greater than the lower threshold $T_L$, wherein the adding of the output of a second of the K feed forward filter branches includes applying a weight $w_k$ to the output of the second of the K feed forward filter branches, wherein the weight $w_k$ is determined in accordance with the instantaneous SNR level $\gamma_k$ associated with the second of the K feed forward filter branches.

19. The method of claim 18 wherein each of the K feed forward filter branches comprises taps have tap weights, and wherein the method further comprises determining the tap weights for the taps of the K feed forward filter branches in accordance with the weight $w_k$, $H_k(f)$, and $N_0$, wherein $H_k(f)$ is a frequency response characterizing a channel over which the $k^{th}$ feed forward filter branch receives a signal, and wherein $N_0$ is noise characterizing the channels.

20. The method of claim 18 wherein the feedback filter comprises taps have tap weights, and wherein the method further comprises determining the tap weights for the taps of the feedback filter in accordance with the weight $w_k$, $H_k(f)$, and $N_0$, wherein $H_k(f)$ is a frequency response characterizing a channel over which the $k^{th}$ feed forward filter branch receives a signal, and wherein $N_0$ is noise characterizing the channels.

* * * * *